United States Patent
Van Wageningen et al.

(10) Patent No.: US 11,522,393 B2
(45) Date of Patent: Dec. 6, 2022

(54) WIRELESS INDUCTIVE POWER TRANSFER

(71) Applicant: KONINKLIJKE PHILIPS N.V., Eindhoven (NL)

(72) Inventors: Andries Van Wageningen, Wijlre (NL); Laurens Henricus Swaans, Honk Kong (HK)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/950,956

(22) Filed: Nov. 18, 2020

(65) Prior Publication Data

US 2021/0075257 A1    Mar. 11, 2021

Related U.S. Application Data

(63) Continuation of application No. 16/019,609, filed on Jun. 27, 2018, which is a continuation of application (Continued)

(51) Int. Cl.
*H02J 50/80* (2016.01)
*H02J 50/10* (2016.01)
(Continued)

(52) U.S. Cl.
CPC ............... *H02J 50/80* (2016.02); *H02J 50/10* (2016.02); *H04B 5/0037* (2013.01);
(Continued)

(58) Field of Classification Search
CPC .. H02J 50/10; H02J 50/80; H02J 5/005; H02J 7/00036; H02J 7/00047; H04B 5/0025;
(Continued)

(56) References Cited

U.S. PATENT DOCUMENTS 8,314,513 B2   11/2012   Aoyama
8,664,801 B2    3/2014   Abe
(Continued)

FOREIGN PATENT DOCUMENTS

JP   2010226836 A   10/2010
WO  2010040015 A2    4/2010
WO  2010136927 A2   12/2010

OTHER PUBLICATIONS

System description, Wireless Power Transfer, vol. I: Low Power, Part 1: Interface Definition, Version 1.0 Jul. 2010, published by the Wireless Power Consortium.

*Primary Examiner* — Hal Kaplan

(57) ABSTRACT

An inductive power transfer system is arranged to transfer power from a power transmitter to a power receiver via a wireless power signal. The system supports communication from the power transmitter to the power receiver based on load modulation of the power signal. The power receiver transmitting a first message to the power transmitter which comprises a standby power signal requirement for the power signal during a standby phase. The power transmitter receives the message, and when the system enters the standby phase, the power transmitter provides the power signal in accordance with the standby power signal requirement during. A power receiver configurable standby phase is provided which may for example allow devices to maintain battery charge or to provide fast initialization of the power transfer phase.

25 Claims, 5 Drawing Sheets

Related U.S. Application Data

Figure 1:
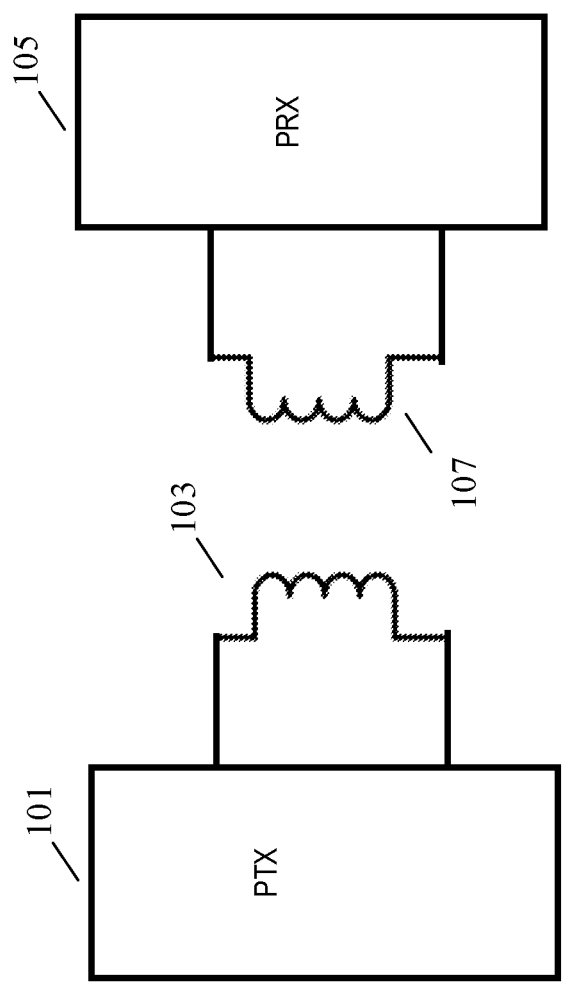

No. 14/417,846, filed as application No. PCT/IB2013/055667 on Jul. 10, 2013, now Pat. No. 10,033,223.

(60) Provisional application No. 61/677,020, filed on Jul. 30, 2012.

(51) Int. Cl.
*H04B 5/00* (2006.01)
*H02J 7/00* (2006.01)

(52) U.S. Cl.
CPC ........ *H04B 5/0093* (2013.01); *H02J 7/00036* (2020.01); *H02J 7/00047* (2020.01)

(58) Field of Classification Search
CPC .. H04B 5/0031; H04B 5/0037; H04B 5/0075; H04B 5/0093; H01F 38/14; H01F 2038/143
USPC ........................................................ 307/104
See application file for complete search history.

(56) References Cited

U.S. PATENT DOCUMENTS

| | | |
|---|---|---|
| 9,362,986 B2 | 6/2016 | Karaoguz |
| 10,439,436 B2 * | 10/2019 | van Wageningen .... H02J 50/90 |
| 2009/0322281 A1 | 12/2009 | Kamijo et al. |
| 2010/0194206 A1 | 8/2010 | Burdo et al. |
| 2010/0225173 A1 | 9/2010 | Aoyama et al. |
| 2011/0169446 A1 | 7/2011 | Kondo |
| 2011/0221390 A1 | 9/2011 | Won et al. |
| 2012/0112543 A1 | 5/2012 | Van Wageningen |

\* cited by examiner

WIRELESS INDUCTIVE POWER TRANSFER

CROSS-REFERENCE TO PRIOR APPLICATIONS

This application is a Continuation of application Ser. No. 16/019,609, filed on Jun. 27, 2018, which is a continuation of U.S. Pat. No. 10,033,223 filed Jan. 28, 2015, which is the U.S. National Phase application under 35 U.S.C. § 371 of International Application No. PCT/IB2013/055667, filed on Jul. 10, 2013, which claims the benefit of U.S. Patent Application No. 61/677,020, filed on Jul. 30, 2012. These applications are hereby incorporated by reference herein.

The invention relates to inductive power transfer and in particular, but not exclusively, to an inductive power transfer system compatible with the Qi wireless power transfer approach.

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver. However, such a bidirectional link is not trivial to include and is subject to a large number of difficulties and challenges. For example, the resulting system still needs to be backwards compatible and e.g. power transmitters and receivers that are not capable of bidirectional communication still need to be supported. Furthermore, the technical restrictions in terms of e.g. modulation options, power variations, transmission options etc. are very restrictive as they need to fit in with the existing parameters. It is also important that cost and complexity is kept low, and e.g. it is desirable that the requirement for additional hardware is minimized, that detection is easy and reliable, etc. It is also important that the communication from the power transmitter to the power receiver does not impact, degrade or interfere with the communication from the power receiver to the power transmitter. Furthermore, an all-important requirement is that the communication link does not unacceptably degrade the power transfer ability of the system.

Accordingly, many challenges and difficulties are associated with enhancing a power transfer system such as Qi to include bidirectional communication.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a standby mode but will sense to detect a possible presence of an object. Similarly, the receiver will wait for the presence of a power signal.

Ping Phase

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

The system allows for an efficient setup and operation of the power transfer. However, there are scenarios where the power transfer system does not operate optimally.

For example, in the existing system, the power transmitter will enter the ping phase from the selection phase when it is detected that a new power receiver is introduced. However, if a power receiver device is e.g. permanently placed on the power transmitter, there is no initiating event, and the power receiver may remain in the selection phase and not be able to re-enter the power transfer phase. This may be a problem for devices that need repowering at intervals. For example, a battery powered device may permanently be placed on a power transmitter. After an initial charging of the battery when the battery powered device is first put on the power transmitter, the system will enter the selection phase. The device may be used while on the power transmitter and the battery may be discharged. At some stage, it may be required that the battery is recharged. However, as the system is in the selection phase it will not be able to perform such a recharging.

In order to avoid such scenarios, it has been proposed for the power transmitter to very occasionally enter the ping phase where it pings the power receiver to see if a new power transfer phase should be re-initiated. However, this is expected to be performed at an interval of several minutes which is too slow for many applications. Reducing the time between the pings will increase power consumption for both power transmitter and power receiver. Thus, reducing the time interval between pings to a value that is suitable for the most critical device/application would result in a large overhead and increased resource consumption which is completely unnecessary for the vast majority of devices.

In order to address this, it has been proposed that the system may leave the selection phase and initiate a new power transfer setup operation in response to receiving an active request from the power receiver. However, this requires that the power receiver can communicate an active message (i.e. it cannot use load modulation as there is no power signal provided by the transmitter). Such an active initiation by the power receiver may be advantageous but requires that the power receiver has sufficient stored energy to generate the message. However, this requires that recharging of the devices, and thus the devices cannot continuously remain in the selection phase.

Specifically, it has been proposed that a power receiver can wake-up a power transmitter by applying an active signal. The power receiver uses an energy source (e.g. a battery) available in the power receiver to generate the wake-up signal. However, not all devices contain a suitable energy source. Furthermore, if an energy storage, like a battery or a capacitor is present, this may become discharged e.g. after intensive use of an application or after a considerable amount of time during which a leakage or standby current has drained the available stored energy. Therefore, recharging will be required.

More generally, whereas the conventional approach may provide very suitable approaches for powering or charging a new power receiver when this is introduced, it tends to be relatively inflexible and not cater for all scenarios in which a power receiver may want to extract power from a power transmitter. Specifically, it merely allows the power receivers either to be powered by the power transmitter as part of a standard power transfer phase or to not be powered. However, many devices have different requirements at different times and furthermore these requirements can vary significantly between devices.

Hence, an improved power transfer system would be advantageous and in particular a system allowing increased flexibility, backwards compatibility, facilitated implementation, improved adaptation to varying power requirements, and/or improved performance would be advantageous.

Accordingly, the Invention seeks to preferably mitigate, alleviate or eliminate one or more of the above mentioned disadvantages singly or in any combination.

According to an aspect of the invention there is provided a method of operation for an inductive power transfer system comprising a power transmitter generating a wireless power signal for a power receiver when in a power transfer phase, the inductive power transfer system supporting communication from the power receiver to the power transmitter based on load modulation of the power signal, the method comprising: the power receiver transmitting a first message to the power transmitter, the first message comprising a standby power signal requirement for the power signal during a standby phase; the power transmitter receiving the message; and the power transmitter providing the power signal in accordance with the standby power signal requirement during the standby phase.

The invention may provide an improved power transfer system. It may in many embodiments allow for further functionality and/or increased performance. An improved user experience may be provided. The invention may allow a practical approach and may facilitate introduction into existing systems.

The approach may introduce a standby phase intended for reduced power consumption, with the power receiver controlling the standby power behavior of the power transmitter.

In many embodiments, the approach may specifically allow improved operation for systems where the power receiver is coupled to the power transmitter for extended amounts of time (including in particular multiple (re)charge operations). In many scenarios, a faster activation of a power receiver device from a standby mode of operation can be achieved.

The power receiver may extract power from the power signal (and thus from the power transmitter) during the standby phase. The standby power signal requirement may be a power requirement of the standby power signal, such as a minimum amplitude or current that can be drawn by the power receiver.

The approach is particularly advantageous in that the power receiver may control the operation of the power transmitter when in the standby phase so that this provides a power signal that meets the specific requirements and preferences of the power receiver (or a device powered by the power receiver). The power receiver may for example control the power transmitter to provide sufficient power for the power receiver to maintain the reduced functionality of the standby phase, and/or it may control characteristics of the power signal such that it allows the power receiver to wake-up the power transmitter sufficiently fast, and specifically such that the power transfer phase can be entered sufficiently fast but without excessive resource usage. For example, time intervals between the power signal being switched on to allow load modulation may be controlled to suit the specific power receiver (or associated device).

The approach is furthermore in line with the general design principles of power transfer systems such as Qi in that it allows the main control to reside with the power receiver.

The approach may also be relatively easy to introduce to systems such as Qi. For example, it may be implemented using only uni-directional communication from the power receiver to the power transmitter.

In the standby phase, the power receiver operates in a reduced power mode. The power consumption of the power receiver when in the standby phase is reduced with respect to the power consumption of the power receiver when in the power transfer mode. The power receiver may in the standby phase perform a reduced functionality. Typically, the reduced functionality may be limited to functionality that allows the system to be initialized to enter a nominal operating mode (specifically the reduced functionality may be limited to wake-up functionality). Specifically, the load may be disconnected by the power receiver when in the standby phase. In the power transfer phase, the load will be connected.

In some scenarios, the system may operate a power control loop when in the power transfer phase but not when in the standby phase.

The term power receiver will be understood to refer to the functionality implemented to enable and perform the wireless power transfer. It will also be understood that the term may refer to the entire functionality powered by the wireless power transfer, and specifically that it may include the load. Specifically, the term may include an entire device supported by the wireless power transfer, such as e.g. a communication or computational device powered via the wireless power transfer. The term may include such broader functionality independently of whether it is implemented in a single unit or in a plurality of (physical or functional) units.

The standby phase may comprise other phases or sub-phases. For example, the standby phase may comprise or consist in a selection phase and a ping phase for a Qi type system.

In accordance with an optional feature of the invention, the standby power signal requirement is indicative of a power requirement of the power signal during the standby phase.

This may be particularly advantageous in many scenarios. The power receiver may specifically control the power transmitter to provide a power signal that allows the power receiver to extract the desired power from the power signal but without excessive resource usage. For example, the power requirement may be a required power level, and especially may be an average or minimum power level. In some scenarios, the power signal may be continuously applied and the power level may be a continuous value. In some embodiments, the power signal may be discontinuous and the standby power requirement may indicate a temporal characteristic of the provided power.

In accordance with an optional feature of the invention, the standby power signal requirement represents a minimum power for a reduced functionality of the power receiver.

This may be particularly advantageous and may allow the system to be optimized to provide sufficient power to support the reduced functionality of the power receiver when in the standby phase but without unnecessarily wasting resource.

In some embodiments, the power receiver may determine the standby power signal requirement in response to a power consumption for a reduced functionality of the power receiver.

In accordance with an optional feature of the invention, the reduced functionality comprises functionality for initializing a wake-up process for the power receiver.

This may in particular allow power consumption to be reduced, and often substantially minimized, while still allowing the power receiver (or attached device) to quickly and efficiently be returned to an operational mode, and specifically to the power transfer phase.

The wake-up process may specifically be a process that transfers the system to the power transfer phase. The wake-up process may specifically be an active wake-up process wherein the power receiver transmits an initialization message to the power transmitter without using load modulation of the power signal, or may e.g. be passive wake-up process wherein the power receiver transmits messages to the power transmitter by load modulating the power signal.

In accordance with an optional feature of the invention, the power requirement represents a minimum power for maintaining an energy storage requirement for the power receiver during the standby phase.

This may be a particularly advantageous approach. The system may specifically ensure that the power receiver can enter a standby phase where power consumption is reduced while still ensuring that the energy stored in the power receiver remains sufficient. Specifically, the approach allows a standby phase with low power consumption while still ensuring that a battery of the power receiver is kept charged to a desired extent, thereby ensuring that the power receiver device remains operational.

In accordance with an optional feature of the invention, the power transmitter is arranged to provide the power signal intermittently during the standby phase, and the standby power signal requirement is indicative of a timing of time intervals in which the power signal is provided.

This may in many embodiments reduce resource consumption and/or reduce functionality. For example, it may allow the trade-off between power consumption and time to initialize a new power transfer to be optimized for the preferences and requirements of the specific power receiver (including the device being powered by the power receiver).

The intermittent power signal may be used to transfer power to the power receiver and/or to provide a signal allowing the power receiver to communicate by load modulation. Indeed, the intermittent power signal may be used to ping the power receiver and/or to power the power receiver during the standby phase.

In accordance with an optional feature of the invention, the power receiver transmits a wake-up message to the power transmitter during the standby phase; and the power transmitter moves to the power transfer phase in response to receiving the wake-up message.

This may allow advantageous operation. The power receiver may enter the power transfer phase in response to transmitting the wake-up message or e.g. in response to receiving a confirmation of the message from the power transmitter.

In some embodiments, the system may move directly to the power transfer phase without any configuration phase being applied. In some embodiments, the system may move to the power transfer phase via one or more intervening phases, such as an intervening ping or configuration phase. In such embodiments, the entering of the power transfer phase may be conditional on the operation in the intervening phases. Thus, the system may only proceed to the power transfer phase in some scenarios (e.g. conditional on an appropriate response by the power receiver in the ping phase).

Thus, the power transfer phase may be initiated using the configuration parameters set prior to the wake up.

In accordance with an optional feature of the invention, the wake-up message is transmitted from the power receiver by load modulation of the power signal during the standby phase.

This may provide efficient operation in many embodiments. Specifically, the power consumption during the standby phase may be reduced. For example, it may allow a power signal to be provided which is insufficient to power the (reduced) functionality of the power receiver but is sufficient to support load modulation. The reduction in power may allow the power signal to be provided with a much higher frequency thereby allowing a much faster wake-up of the system.

In some embodiments, the wake-up message is transmitted by the power receiver using functionality powered from an internal energy store of the power receiver.

This may provide improved performance in some scenarios. In particular, the power receiver may transmit the wake up message without the power transmitter needing to provide a power signal for this purpose.

In accordance with an optional feature of the invention, the power receiver determines an energy storage level for an energy store of the power receiver and transmits a second message to the power transmitter during the standby phase if the energy storage level is below a threshold; and wherein the power receiver and the power transmitter initiate a power transfer operation if the second message is transmitted.

This may provide advantageous performance and may in particular allow an efficient way of maintaining sufficient energy in the power receiver without requiring the standby phase to provide power transfer. Thus, the normal power transfer operation is used but it may be applied simply to recharge an energy storage (such as e.g. a capacity holding a charge sufficient to power part of the functionality for a short time interval).

In accordance with an optional feature of the invention, the first message indicates a maximum duration of an interval in the standby phase in which no power signal is provided by the power transmitter.

This may provide efficient performance in many scenarios and may in particular in many embodiments facilitate introduction of the standby phase to existing systems. Specifically, it may provide an efficient way of implementing the standby phase using the selection phase and the ping phase of the Qi systems. The first message may provide a timing indication for when to switch between the selection phase and the ping phase, such as e.g. a maximum duration of the selection phase.

In accordance with an optional feature of the invention, the power receiver sets a power level for the power signal by transmitting power control error messages at the end of the power transfer phase, and the standby power signal requirement is indicative of a requirement to maintain the power level during the standby phase.

This may provide efficient yet low complexity operation.

In accordance with an optional feature of the invention, the power receiver is arranged to transmit the first message during the power transfer phase.

This may provide efficient yet low complexity operation in many embodiments and may in particular allow robust operation with efficient signaling.

In accordance with an optional feature of the invention, the power transmitter is arranged to enter the standby phase in response to receiving an end of power transfer phase message.

This may provide efficient yet low complexity operation in many embodiments and may in particular allow robust operation with efficient signaling.

In accordance with an optional feature of the invention, the power receiver charges an internal energy store from the power signal during the standby phase.

This may provide advantageous performance and may in particular allow an efficient way of maintaining sufficient energy in the power receiver.

In accordance with an optional feature of the invention, the power transmitter and power receiver switches from the standby phase to the power transfer phase without entering a configuration phase.

This may in many scenarios allow a more efficient and/or in particular faster wake-up of the power receiver. Thus, the power transfer phase may be initiated using configuration parameters set prior to the wake-up.

In some embodiments, the power transmitter and power receiver switches from the standby phase (directly) to a ping phase.

In some embodiments, the power transmitter and power receiver switches from the standby phase (directly) to a configuration phase.

In accordance with an optional feature of the invention, the power receiver is arranged to transmit the first message during a configuration phase occurring prior to the power transfer phase.

This may provide efficient yet low complexity operation in many embodiments and may in particular allow robust operation with efficient signaling. The approach may allow the configuration of the standby phase to be performed in accordance with the same principles and approaches as configuration procedures for other parameters. This may for example allow reuse of functionality.

In accordance with an optional feature of the invention, the power receiver is arranged to transmit a second message to the power transmitter indicating an activity to be performed by the power transmitter in response to receiving a wake-up message.

This may provide a more flexible system and may allow the operation of the system to be adapted to the specific requirements and preferences of the individual power receiver. For example, the power receiver may define or request that the power transmitter enters the power transfer phase directly without entering a configuration phase after waking up from the standby mode, or that it should enter the configuration phase first. In some embodiments, the power receiver may command or request that the power transmitter responds to a wake-up message by providing a power signal which can be power modulated by the power receiver.

In some embodiments, the second message indicates a phase that the power transmitter should enter after a wake-up from the standby phase.

In some embodiments, the second message indicates whether the power transmitter should skip a configuration phase between the standby phase and the power transfer phase.

According to an aspect of the invention there is provided a method of operation for a power transmitter of an inductive power transfer system comprising the power transmitter and a power receiver, the inductive power transfer system supporting communication from power receiver to the power transmitter based on load modulation of the power signal, the method comprising: generating a wireless power signal for a power receiver when in the power transfer phase; receiving a first message comprising a standby power signal requirement for the power signal during a standby phase; and providing the power signal in accordance with the standby power signal requirement during a standby phase.

According to an aspect of the invention there is provided method of operation for a power receiver of an inductive power transfer system comprising a power transmitter for generating a wireless power signal for the power receiver when in a power transfer phase, the inductive power transfer system supporting communication from the power receiver to the power transmitter based on load modulation of the power signal, the method comprising: extracting power from the power signal when in the power transfer phase; transmitting a first message to the power transmitter, the first message comprising a standby power signal requirement for the power signal during a standby phase; and receiving the power signal when in the standby phase.

According to an aspect of the invention there is provided an inductive power transfer system comprising a power transmitter and a power receiver, the inductive power transfer system being arranged to transfer power from the power transmitter to the power receiver via a wireless power signal and supporting communication from the power receiver to the power transmitter based on load modulation of the power signal, wherein the power receiver comprises a transmitter for transmitting a first message to the power transmitter, the first message comprising a standby power signal requirement for the power signal during a standby phase; and the power transmitter comprises: a power unit for generating the power signal to provide power transfer to the power receiver when in a power transfer phase: a receiver for receiving the first message; and a standby unit for providing the power signal in accordance with the standby power signal requirement during the standby phase.

According to an aspect of the invention there is provided a power transmitter for an inductive power transfer system comprising the power transmitter and a power receiver, the inductive power transfer system supporting communication from the power receiver to the power transmitter based on load modulation of the power signal, the power transmitter comprising: a generator for generating a wireless power signal for the power receiver when in a power transfer phase; a receiver for receiving a first message comprising a standby power signal requirement for the power signal during a standby phase; and a standby unit for providing the power signal in accordance with the standby power signal requirement during the standby phase.

According to an aspect of the invention there is provided a power receiver for an inductive power transfer system comprising a power transmitter for generating a wireless power signal for the power receiver when in a power transfer phase, the inductive power transfer system supporting communication from the power receiver to the power transmitter based on load modulation of the power signal, the power receiver comprising: a power unit for extracting power from the power signal when in the power transfer phase; a transmitter for transmitting a first message to the power transmitter, the first message comprising a standby power signal requirement for the power signal during a standby phase; and a receiver for receiving the power signal when in the standby phase.

These and other aspects, features and advantages of the invention will be apparent from and elucidated with reference to the embodiment(s) described hereinafter.

Figure 2:
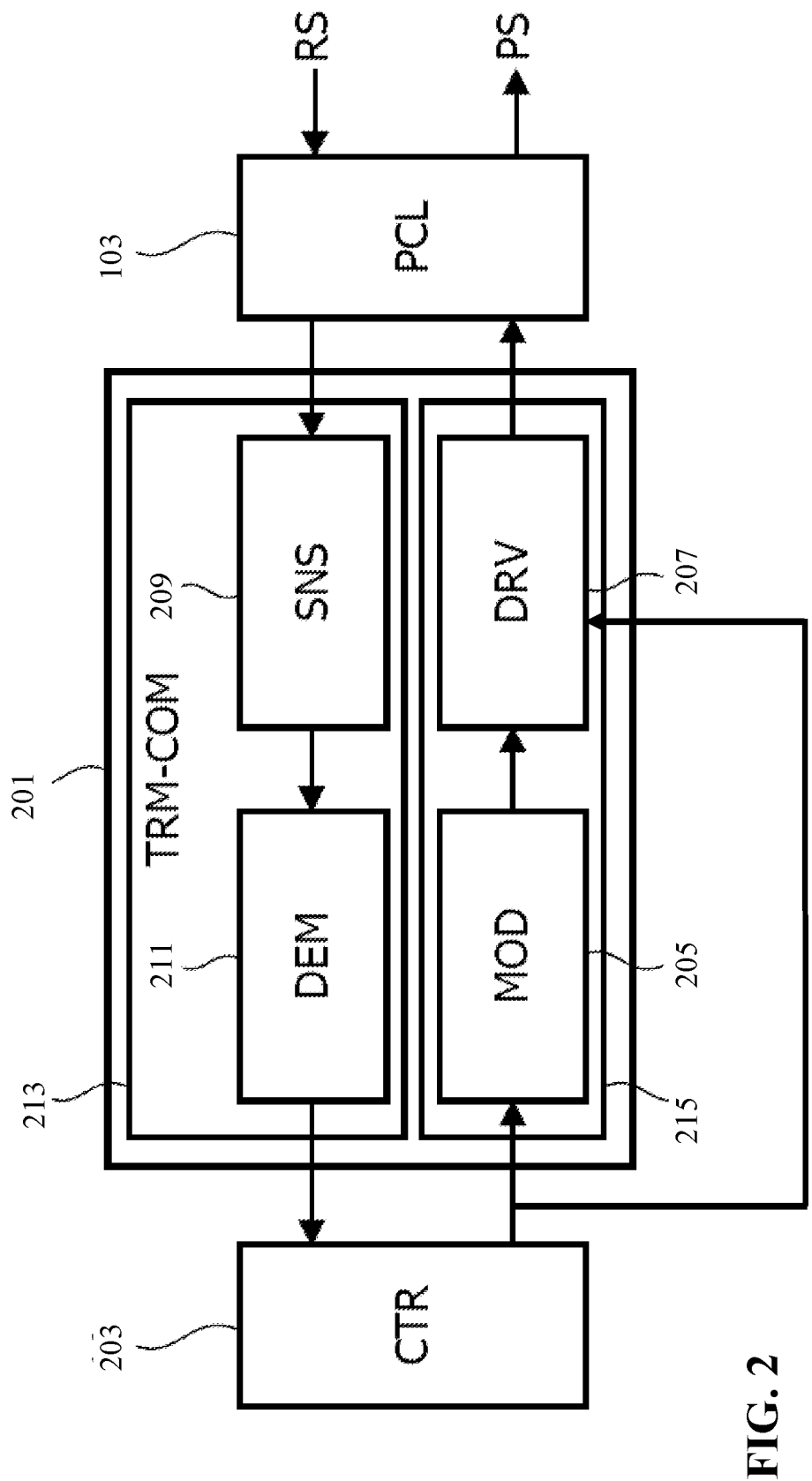
Figure 3:
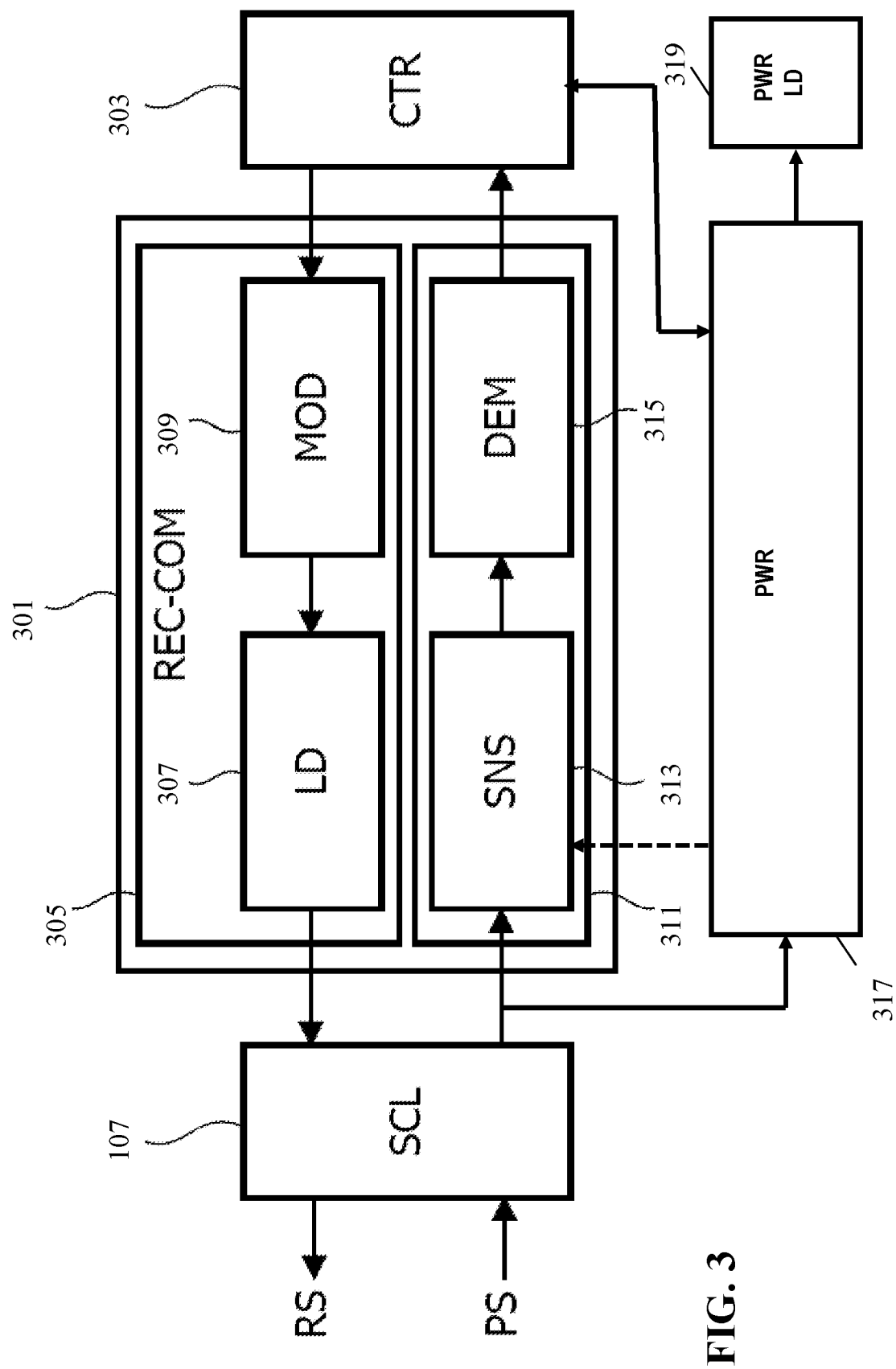
Figure 4:
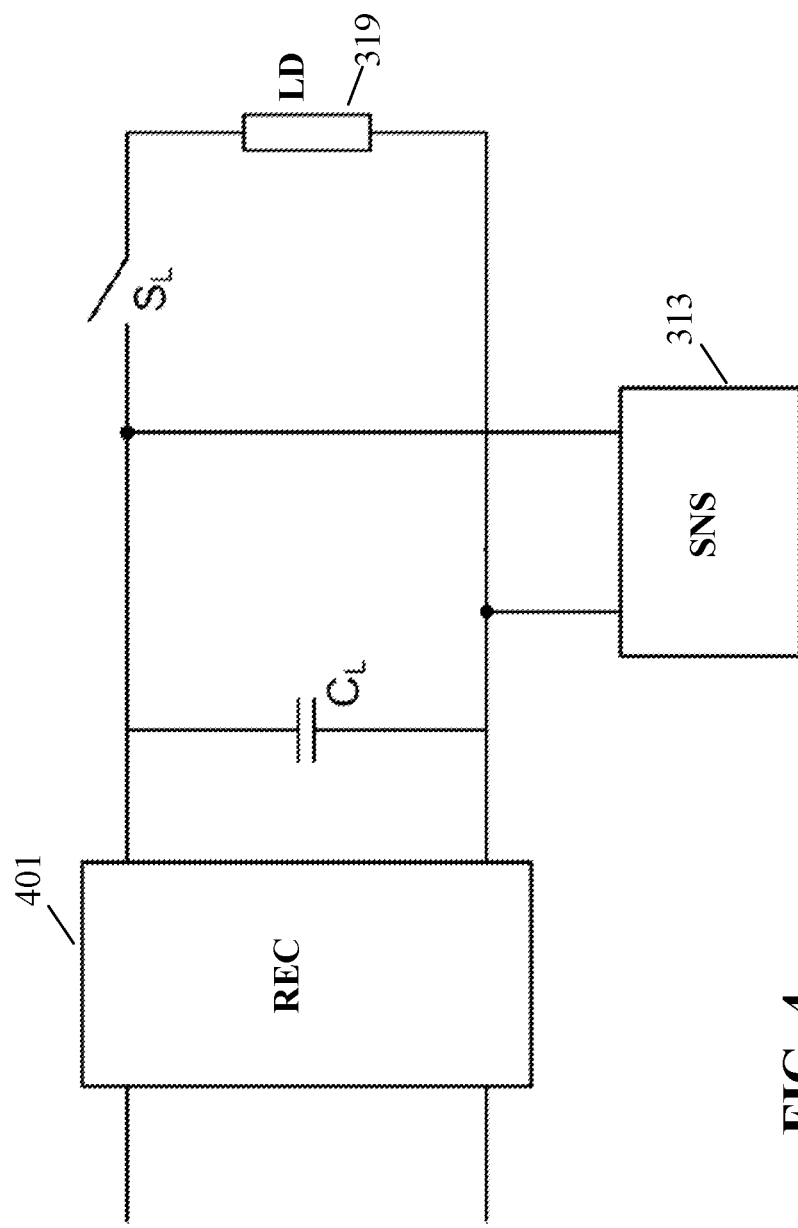
Figure 5:
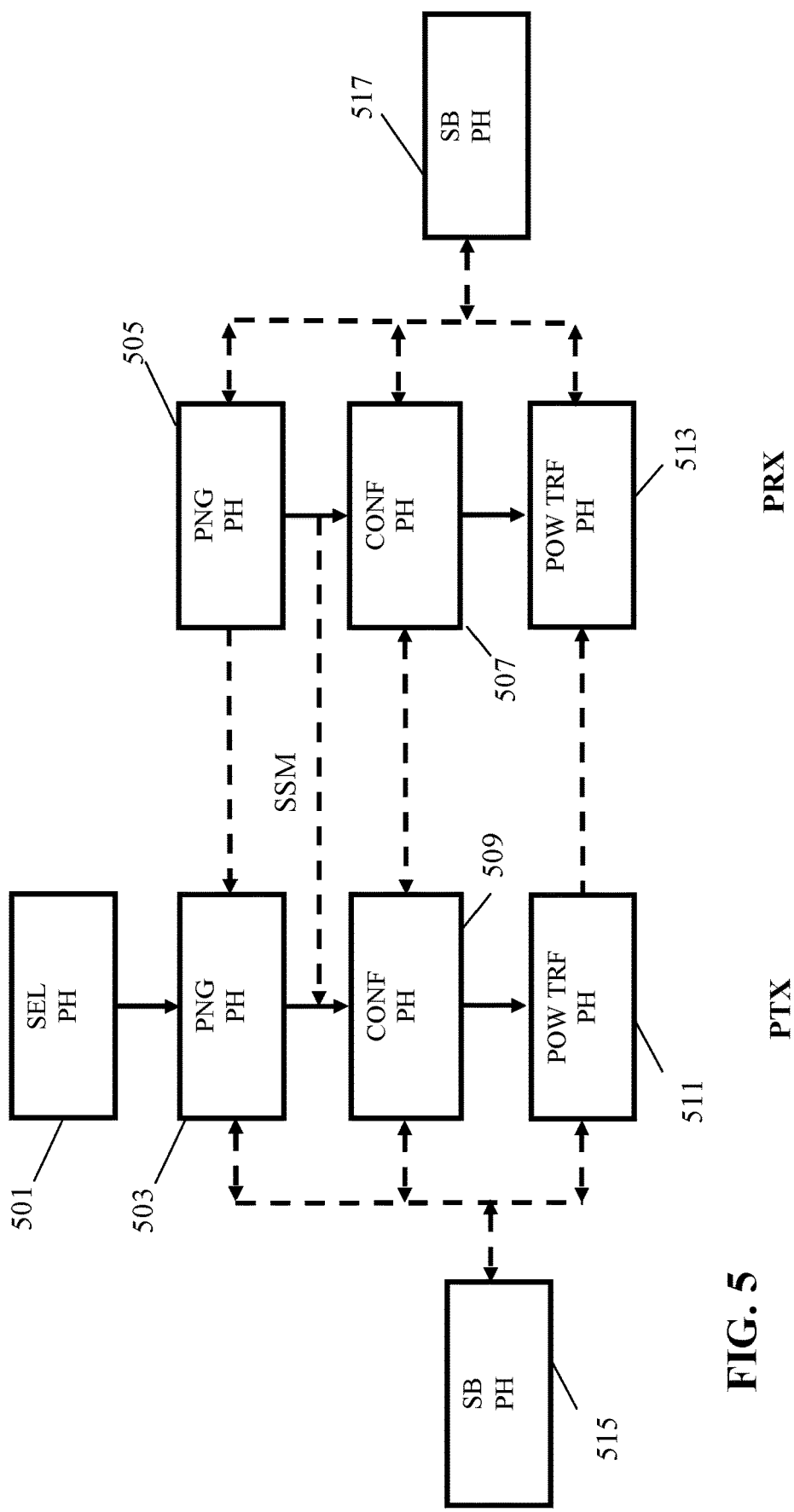

Embodiments of the invention will be described, by way of example only, with reference to the drawings, in which FIG. 1 provides an exemplary illustration of a power transfer system in accordance with some embodiments of the invention;

FIG. 2 provides an exemplary illustration of a power transmitter in accordance with some embodiments of the invention;

FIG. 3 provides an exemplary illustration of a power receiver in accordance with some embodiments of the invention;

FIG. 4 provides an exemplary illustration of a power receiver in accordance with some embodiments of the invention; and FIG. 5 provides an exemplary illustration of a method of operation for a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

It will be appreciate that the power receiver 105 may e.g. be a single integrated device providing both a user functionality (e.g. a communication or computational function) as well as the power transfer/extracting functionality. In other scenarios, the power receiver 105 may only comprise the functionality for extracting power with the power being provided to an external load. In the following the term power receiver 105 will be used to denote both the power transfer/extraction functionality in itself, as well as the combined functionality of the power transfer/extraction functionality and a load powered by this functionality. Specifically, the term will also refer to a combination of a power transfer device and a user device powered by the power transfer device.

The system provides a wireless inductive power transfer from the power transmitter 101 to the power receiver 105. Specifically, the power transmitter 101 generates a power signal which is propagated as a magnetic flux by the transmitter coil 103. The power signal may typically have a frequency between around 100 kHz to 200 kHz. The transmitter coil 103 and the receiver coil 105 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the electrical signal provided to the transmitter coil 103 but it will be appreciated that by equivalence it may also be considered and used as a reference to the magnetic flux signal, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the identification & configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

The system then moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

It is noted that the Qi wireless power specification versions 1.0 and 1.1 define only communication from the power receiver 105 to the power transmitter 101, i.e. it defines only a unidirectional communication.

However, in the system of FIG. 1 bidirectional communication is used, i.e. communication of data is also possible from the power transmitter 101 to the power receiver 105. Various applications may benefit from such communication, for example: setting a power receiver in test mode, setting a power receiver in calibration mode, or allowing communication from power transmitter to power receiver under the control of the power receiver, e.g. for communicating a command, or status information from power transmitter to power receiver.

Although the bi-directional communication may provide advantages in many scenarios and embodiments, this is merely an optional feature. Indeed, the principles and operation described in the following may be implemented without using or relying on communication from the power transmitter 101 to the power receiver 105.

FIG. 2 illustrates the power transmitter 101 of FIG. 1 in more detail. The transmitter coil 103, also called the primary coil 103 (PCL), is shown connected to a power transmitter communication unit 201 (TRM-COM), which is coupled to a transmitter controller 203 (CTR).

The power transmitter communication unit 201 has a modulator 205 (MOD), coupled to a driver 207 (DRV) for driving the transmitter coil 103 for transmitting a (potentially) modulated power signal (PS) via the transmitter coil 103 to the receiver coil 105. The driver 207 is coupled to the transmitter controller 203 which may control the driver to provide a power signal to have the desired characteristics, such as a desired power level (amplitude and/or current). The power signal is thus dependent on both the control from the controller as well as (optionally) on the modulation by the modulator 205 if the power signal is also used to communicate a message from the power transmitter 101 to the power receiver 105.

In the system, the power receiver 105 may load modulate the power signal to send a power receiver signal to the power transmitter 101 via the receiver coil 107 and the transmitter coil 103. This signal is called a reflected signal (RS). The reflected signal is detected by a sense unit 209 (SNS), e.g. by sensing the current or voltage on the transmitter coil 103. A demodulator 211 (DEM) is coupled to the transmitter controller 203 for demodulating the detected signal, e.g. by converting changes in the amplitude or phase of the detected signal into bits.

In the example of FIG. 2, a first unit 213 is arranged to receive data from the power receiver 105 via the transmitter coil 103. The first unit 213 comprises the sense unit 209 and the demodulator 211. These two units implement the function of receiving the data via the transmitter coil 103. The transmitter coil 103 transmits an alternating magnetic field (the power signal PS) for inductive power transfer to the receiver coil 107 and receives the reflected magnetic field (reflected signal RS) caused by the receiver coil 107 (i.e. the variations in the power signal caused by the load modulation). The sense unit 209 (current/voltage sensor SNS) senses the current/voltage on the transmitter coil 103. The demodulator 211 translates changes of amplitude or phase of the sensed signal into data.

The transmitter controller 203 interprets the received data and may in response control a second unit 205 to transmit a message to the power receiver 105 via the transmitter coil 103. The message may in the example specifically be a response message intended for responding to messages from the power receiver 105, and may specifically be an acknowledge/non-acknowledge or accept/reject message. Such a communication arrangement may allow a low complexity approach and may avoid the need for complex communication functionality and protocols for supporting the power transmitter to power receiver communication. The approach may further allow the power receiver to remain the controlling element for the power transfer, and thus fits well with the general design principles of the Qi power transfer approach.

Specifically, the transmitter controller 203 controls the modulator 205 which modulates the power signal to provide the desired message. The modulator 205 may specifically modulate the power signal by changing the amplitude, frequency, or phase of the power signal, i.e. it may typically use AM, FM and/or PM modulation. The driver 207, also comprised by the second unit 215, is arranged to transmit the modulated power signal via the transmitter coil 103 to the power receiver 105 by supplying an alternating electric signal to the transmitter coil 103.

The controller 203 is further arranged to control the power transfer settings and to implement the required control and operational phases and functionality. In particular, the controller 203 may receive and interpret the messages from the power receiver 103, and may in response e.g. set the required power level for the power signal. Specifically, during the identification and configuration phase, the controller 203 may interpret the configuration packet or message from the power receiver 105 and may e.g. set the maximum power signal level accordingly. During the power transfer phase, the transmitter controller 203 may increase or decrease the power level in accordance with the control error messages received from the power receiver 105.

FIG. 3 illustrates the power receiver 105 of FIG. 1 in more detail. The receiver coil 107 (SCL) is shown connected to a power receiver communication unit 301 (REC-COM), which is coupled to a receiver controller 303 (CTR). The power receiver 105 comprises a first unit 305 for sending data to the power transmitter 101 via the receiver coil 107 to the transmitter coil 103. The first unit 305 has a changeable load (LD) 307 coupled to a modulator 309 (MOD) for modulating the load at the receiver coil 107 for generating the reflected signal (RS) for transmitting data to the power transmitter 101. It will be understood that the first unit 305 is a functional unit that comprises the modulator 309 and the changeable load 307.

The power receiver 105 further comprises a second unit 311 for receiving a message from the power transmitter 101 via the receiver coil 107. For this purpose, the second unit 311 comprises a sense unit 313 (SNS) for detecting a modulated power signal (PS) received via the receiver coil 107 from the power transmitter 101, e.g. by sensing a voltage or current.

The second unit 311 further comprises a demodulator 315 (DEM), which is coupled to the sense unit 313 and the receiver controller 303. The demodulator 315 demodulates the detected signal according to the used modulation. The modulation may for example be an Amplitude Modulation (AM), Phase Modulation (PM) or Frequency Modulation (FM), and the demodulator 315 may perform the appropriate demodulation to obtain the message, e.g. by converting changes in the amplitude, frequency and/or phase of the detected signal into bits.

As an example, the receiver coil 107 may receive the power signal for inductive power transfer from the transmitter coil 103 and may send a reflected signal to the transmitter coil 103 by varying the load 307. Thus, the variations of the load 307 provide the modulation of the power signal. The modulator 309 controls the amplitude (and/or frequency and/or phase of the reflected signal), i.e. it controls the operation of the load 307, e.g. by connecting/disconnecting an impedance circuit. The current/voltage sense unit 313 senses the current/voltage on the receiver coil 107 as received from the power transmitter 101. The sense unit 313 may be part of another function of the power receiver and specifically may be part of the rectification and smoothing of the power signal used to generate a DC power. The demodulator 315 translates changes of the sensed signal into data. The receiver controller 303 (amongst other things) controls the modulator 309 to communicate data and interprets the data received by the demodulator 315.

The power receiver coil 107 is further connected to a power unit 317 which is arranged to receive the power signal and to extract the power during the power transfer phase. The power unit 317 is coupled to a power load 319 which is the load powered from the power transmitter 101 during the power transfer phase. The power load 319 may be an external power load but is typically part of the power receiver device, such as a battery, display or other functionality of the power receiver (e.g. for a smart phone the power load may correspond to the combined functionality of the smart phone).

The power receiver coil 107 may specifically include a rectifier circuit, a smoothing circuit (a capacitor) and a voltage (and/or current) regulation circuit in order to provide a stabilized DC output voltage (or current) supply.

The power unit 317 is coupled to the receiver controller 303. This allows the receiver controller 303 to determine the operational characteristics of the power circuit and e.g. may be used to provide information on the current operating point to the receiver controller 303. The receiver controller 303 may use this to generate the control error messages during the power transfer phase. The receiver controller 303 may further control the operation of the power unit 317, e.g. the receiver controller 303 may switch the load in and out. Specifically, the receiver controller 303 may control the power unit 317 to disconnect the load during the configuration phase and connect it during the power transfer phase.

In the system of FIG. 3, the sense unit 313 is shown to directly receive the power signal and the second unit 311 demodulates the data directly from the power signal. This may for example be useful for frequency modulation.

However, in many scenarios the sense unit 313 may not directly sense the power signal but rather a signal of the power unit 317.

As a specific example, the sense unit 313 may measure the rectified and smoothed voltage generated by the power unit 317. This may be particularly suitable for AM modulation of the power signal.

Specifically, FIG. 4 illustrates elements of the power unit 317 in more detail. The signal from the receiver coil 107 is rectified by a rectifier 401 (typically a bridge rectifier) and the resulting signal is smoothed by the capacitor $C_L$ resulting in a smoothed DC voltage (with a ripple depending on the power consumption and value of CL). FIG. 4 furthermore shows a switch $S_L$ for switching the power load 319 in and out. In order to ensure a sufficiently low ripple during power transfer the capacitor $C_L$ is typically selected to be relatively high thereby leading to a slow time constant for capacitor and load combination.

In the example, the power transmitter 101 may apply amplitude modulation to the power signal in order to communicate from the power transmitter 101 to the power receiver 105. This will result in amplitude changes across the capacitor $C_L$, and in the example the sense unit 313 is coupled to measure this voltage. Thus, the voltage variations across the capacitor $C_L$ may be detected and used to recover the data modulated onto the power signal. Using such an approach may reduce cost and complexity as it allows components to be reused.

In contrast to conventional power transfer systems, the system of FIG. 1 may provide additional functionality and an improved user experience, especially for power receivers being coupled to the power transmitter 101 for extended durations (typically significantly longer than the time spent in the power transfer phase). The system may specifically support the Qi Standard version 1.0 and 1.1 but be enhanced to provide additional functionality.

Specifically, the system provides for a standby phase wherein the power transmitter 101 provides a power signal with properties that have been defined by the power receiver 105. In particular, the power receiver 105 transmits a message which comprises a standby power signal requirement for the power signal during a standby phase. The power transmitter 101 receives the message and interprets the standby power signal requirement. When the power transmitter 101 then enters the standby phase, it proceeds to generate a power signal that matches the requirement.

Thus, the system can operate be in a standby phase wherein a power signal is still generated and can be used by the power receiver 105 (e.g. to maintain the charge of an internal battery). Furthermore, the characteristics of the power signal are controlled by the power receiver 105 such that the power signal can be adapted to the specific requirements of the power receiver 105. This may not only provide improved performance and adaptation but may typically also substantially reduce the power consumption during the standby power phase and/or e.g. reduce the wake up time for the receiver.

Typically, the power receiver 105 may transmit a message which results in the power transmitter 101 generating a small amount of power during the standby phase which can then be extracted to support a reduced low power functionality during this phase. As a specific example, the approach may allow a standby power transfer to be used to charge a battery in a mobile device while this is in a standby mode of operation.

During the ping, identification & configuration and power transfer phase the system can be regarded to be in normal operational mode wherein the power receiver may control the power transmitter. The selection phase can be regarded as the phase for reduced power consumption wherein the power transmitter may decide to enter the ping phase (as part of the standby phase) for providing a power signal or not. The approach thus introduces a standby phase suitable for reduced power consumption and in which the standby power behavior of the power transmitter is controlled by the power receiver.

FIG. 5 illustrates an example of the operation of the power transfer system of FIG. 1.

Initially, the power transmitter 101 is in the selection phase 501 wherein no power signal is generated and the power transmitter 101 is effectively in a dormant mode of operation. However, the power transmitter 101 still monitors for the presence of a power receiver 105. If it detects the potential presence of a power receiver 105, it enters the ping phase 503. The detection may for example be based on a detection of a change in capacitance, etc.

In the ping phase 503, the power transmitter 101 temporarily powers up for a short duration. This signal may power the power receiver 105 (or at least indicate the presence of the power transmitter 101 to the power receiver 105), and in response the power receiver 105 enters the ping phase 505. The power receiver 105 then transmits a signal strength message to the power transmitter 101 by load modulation of the power signal. The message may indicate that no power transfer is required in which case the power transmitter 101 returns to the selection phase 501. If the power receiver 105 does require the initiation of a power transfer, the message will indicate so. In this case, the power receiver 105 enters a configuration phase 507 after having transmitted the signal strength message, and the power transmitter 101 enters the configuration phase 509 in response to receiving the message.

The power transmitter 101 and power receiver 105 then proceed to perform the configuration phase 507, 509 to establish a first set of power transfer parameters. Specifically, the power receiver may provide an identification of itself (such as by a version number) and a power transfer value may be defined.

In the configuration phase 507, 509 messages are exchanged between the power receiver 105 and the power transmitter 101 to establish operating parameters, and in particular operating parameters for the power transfer operation.

The configuration phase 507, 509 may specifically be based on unidirectional communication from power receiver 105 to power transmitter 101. In particular, the configuration phase 507, 509 may correspond to the Identification & Configuration phase as defined by the Qi specification version 1.0 and 1.1. Specifically, the power receiver 105 may provide an identification of itself (such as by a version number) and a power transfer value may be defined.

Alternatively or additionally, the configuration phase may include a bidirectional message exchange that allows various operating parameters to be defined. Thus, in some embodiments the configuration phase 507, 509 may also utilize communication of messages from the power transmitter 101 to the power receiver 105.

For example, the configuration phase may first comprise a uni-directional configuration subphase such as the Identification & Configuration defined by the Qi specification version 1.0 and 1.1. This may be followed by a bidirectional negotiation phase wherein the power transmitter 101 and power receiver 105 may negotiate parameters. The negotiation phase may specifically be based on the power receiver 105 transmitting requests to the power transmitter 101 and the power transmitter 101 responding to each request with a message accepting or rejecting the proposed parameter.

The negotiation phase may be optional, and specifically may only be entered if both devices are capable of supporting such a phase. For example, the power transmitter 101 and/or power receiver 105 may be capable of performing a Qi version 1.0 or 1.1 configuration with any corresponding Qi version 1.0 or 1.1 device. However, if both devices are capable of supporting a negotiation phase (which is not part of the Qi specification version 1.0 or 1.1), the devices may perform the negotiation phase to determine and configure more parameters than possible when complying with the Qi Specification version 1.0 or 1.1. The approach may thus provide backwards compatibility while providing enhanced functionality for suitably capable devices.

More description of such a negotiation phase may be found in U.S. 61/665,989 which is hereby incorporated in its entirety by reference.

Following the configuration phase 507, 509, the power transmitter 101 and power receiver 105 move into the power transfer phase 511, 513 wherein the power receiver 105 is powered by the power transmitter 101. The power transfer is performed using the parameters set in the configuration phase 507, 509.

In conventional systems, the system would return to the selection phase 501 following the termination of the power transfer phase 511, 513. The system would then remain in the selection phase. However, the power receiver 105 may be a device staying in the same position for extended periods (e.g. a lamp or a communication or computing device being positioned on the power transmitter may remain there for a very long time (e.g. a laptop may normally be used when placed on a power transmitter positioned on an office desk and only occasionally removed therefrom)). In such scenarios the battery of the device would gradually discharge due to power being consumed by some circuitry or simply due to leakage currents. Furthermore, as there is no change in the location of the power receiver, the power transmitter cannot use this to initiate a new power cycle.

It has been proposed that the power transmitter may enter the ping phase at predetermined time intervals to investigate if a power receiver needs further power. However, this will tend to either result in an efficient operation with typically unnecessarily high power consumption, and/or to result in the delay in waking up the power transmitter being too long for the power receiver (e.g. proposed times have been around every five minutes to reduce power consumption). To address such issues, it has been proposed that the power receiver may send an active message to the power transmitter without a power signal being present. An active message is communicated from the power receiver 105 to the power transmitter 101 using energy provided by the power receiver 105. Thus, it is not just a passive load modulation of a power signal provided by the power transmitter 101 but is a message communicated by a signal generated by the power receiver 105. Indeed, the active message cannot use passive load modulation (as there may not be any power signal) but must be based on the power receiver generating a signal that is fed to the receiver coil 107 and picked by the transmitter coil 103. However, such an approach requires the power receiver to have an internal energy store. Such an internal energy store will inherently be discharged with time.

In the system of FIG. 1, the power transmitter 101 and the power receiver 105 may enter a standby phase 515, 517 in which a standby power signal is still provided by the power transmitter 101 but in accordance with specific requirements that have been communicated to the power transmitter 101 from the power receiver 105. Thus, the operation of the power transmitter 101 in the standby phase 515, 517 can be optimized for the specific power receiver 105. In the system, the power receiver 105 specifically transmits a requirement message to the power transmitter 101 which contains a standby power signal requirement indicating one or more characteristics required of the power signal when the system operates in the standby phase. The requirement message may be a dedicated message or may be a message in which the standby power signal requirement is included together with other data. The requirement message may for example be communicated as part of the configuration phase 507, 509 (e.g. as part of a negotiation subphase thereof) or may e.g. be communicated as part of the power transfer phase 511, 513.

As a very specific example, during the configuration phase 507, 509, the power receiver 105 may communicate a requirement that during a standby phase 515, 517, a power signal with a specific reduced power level which is suitable for trickle charging a battery of the power receiver 105 should be provided. The power transmitter 101 will then provide such a reduce power level power signal during the standby phase 515, 517 and the power receiver 105 will use this to keep the battery charged. This may for example ensure that the power receiver 105 is always able to transmit an active wake up message.

In the standby phase 515, 517 the power receiver 105 operates in a reduced functionality/reduced power consumption mode. Typically, the main functionality of the power receiver 105 is switched off during such a standby mode, and particularly the load 319 is disconnected from the power unit 317. Specifically, the power receiver 105 may in the standby phase 515, 517 only power the functionality required for maintaining an energy store of the power receiver 105 and for interfacing with the power transmitter 101.

In many embodiments, the standby power signal requirement may include an indication of a standby power requirement, and specifically of a power level that should be provided by the power transmitter 101 during the standby phase 515, 517. The power level may for example be a minimum power level which the power signal should provide in order to support the power receiver 105 during the standby phase 515, 517. The power level may be a power level that should be provided continuously or may for example be a power level to be provided in a discontinuous mode. For example, the power level may be an average power level (and possibly a minimum average power level), which may e.g. be defined by a given duty cycle for a power signal with a given power level and/or as a given power level to be applied with a given duty cycle. The standby power signal requirement may thus provide an indication of the specific power that should be provided by the power transmitter 101 when in the standby phase 515, 517. However, at the same time it can be ensured that the power consumption of the power transmitter 101 during the standby phase 515, 517 can be reduced to the minimum that is required for supporting the reduced functionality of the power receiver 105.

In many embodiments, the power transmitter 101 may be arranged to provide a continuous power signal with a reduced power level during the standby phase 515, 517. The power receiver 105 may (pre)determine how much power is consumed when operating in a standby mode where only a reduced functionality is powered/active. This power requirement may then be communicated to the power transmitter 101 which accordingly proceeds to apply a continuous power signal during the standby phase thereby allowing the power receiver 105 to support the reduced functionality from the power signal while remaining in the standby phase.

Thus, in such an example, the power receiver 105 is continuously powered while in the standby phase with a power signal having reduced power. This allows the power receiver 105 to be kept ready for activation and/or ready to activate the power transmitter 101. For example, a computational device with no internal power may be placed on a power transmitter 101 and switched into a standby mode of operation. In the standby mode of operation the functionality of the computational device may be limited to extracting power from the power signal and monitoring for a user input. This reduced functionality requires very little power to be provided, and therefore the computational device can prior to entering the standby phase request that a power signal is provided that is just sufficient to support this reduced functionality and low power consumption. Therefore, only very little power is drawn by the power transmitter 101. When a user provides a user input to wake-up the computational device (to transition the computational device from the standby phase to the operational phase), the computational device may e.g. transmit a wake-up message to the power transmitter 101. In response to receiving the wake-up message, the power transmitter 101 exits the standby phase and e.g. moves to the ping phase. The power transmitter 101 and the power receiver 105/computational device then proceeds to perform the normal process to enter into the power transfer phase in which the power transmitter 101 provides a power signal sufficient to power the normal operation and full functionality of the power transmitter 101.

Thus, the reduced functionality operated by the power receiver 105 during the standby phase may specifically include functionality that can initialize a wake-up of the power receiver 105. The wake-up functionality may initialize the process that allows the power receiver 105 to exit the standby phase/standby mode of operation and enter a normal operational phase/mode.

Alternatively or additionally, the reduced functionality operated by the power receiver 105 during the standby phase 515, 517 may include functionality that can initialize a power transfer for the system. The wake-up functionality may initialize a process that allows the power receiver 105 and power transmitter 101 to exit the standby phase 515, 517 to enter the power transfer phase 511, 513.

The wake-up functionality may specifically be arranged to wake up/boot up the power receiver 105 and/or to initialize the power transfer operation. Accordingly, the standby power signal requirement for the power signal during a standby phase may request a power signal that guarantees a minimal power level for the power receiver allowing at least its most essential boot-up process to be operated.

In some embodiments, the reduced functionality may include functionality for maintaining an energy storage requirement for the power receiver during the standby phase. The power receiver 105 may contain an energy store, such as a battery or a capacitor holding a charge (which e.g. may be used to power functionality of the power receiver 105). If no power is provided to such an energy store, the stored energy will gradually be reduced due to the power consumption of any remaining functionality powered by the energy store during the standby phase, or e.g. due to spurious current draws (leakage currents). In the described systems, such energy loss may be compensated during the standby phase by use of the power signal provided by the power transmitter 101 in this phase. Thus, the standby power signal requirement may indicate a requirement of the power signal which will allow the power receiver 105 to extract power that can be stored in the energy store. Specifically, trickle charging may be supported.

The power level requirement may be a predetermined value applied by the power receiver 105. E.g. the power receiver 105 may be designed to trickle charge its battery during the standby phase with a charge current of, say, 1 mA. In this case, the standby power signal requirement is set to indicate that a power signal should be provided during the standby phase from which the power receiver 105 can continuously extract a charge current of 1 mA (at the appropriate charge voltage). In other embodiments, the power receiver 105 may apply more complex algorithms to determine a suitable power signal requirement. For example, the specific battery status may be determined, and the desired charge current may be calculated. The corresponding requirements for the power signal may then be determined and the standby power signal requirement set accordingly. The power receiver may indeed in many embodiments determine the standby power signal requirement in response to a charge or energy stored status for an energy store powering the power receiver during standby.

In contrast to the power transfer phase 511, 513, the standby phase 515, 517 will typically not include any power control loop. In the power transfer phase of systems such as Qi, the power receiver 105 transmits power control errors during the power transfer phase 511, 513. These power control error messages are used to increase or decrease the power level of the power signal as requested by the power receiver 105. However, in the standby phase 515, 517, the functionality, complexity and accordingly power consumption may advantageously be minimized, and this may include the standby phase 515, 517 not including any power control loop. Thus, the parameters and characteristics of the power signal may be kept constant during the standby operation.

In the previous examples, a continuous power signal was provided e.g. to allow trickle-charging of a battery thereby allowing the battery to be fully charged hours or even days after the charge was completed. Additionally or alternatively, the approach could be used to enable a power receiver without any form of energy storage to remain alert for user interactions.

In a continuous power standby mode, the power transmitter 101 can keep its operation point constant while providing the standby power to the power receiver 105. The power receiver 105 does not need to communicate any messages to the power transmitter 101 during standby.

The power transmitter 101 may leave the standby phase 515 when it is interrupted by an event, e.g. when an active wake-up message is received from the power receiver 105. Alternatively, the triggering event could be a time-out indicating that the ping phase 503 should be entered. Thus, in some embodiments, the system may at regular intervals leave the powered standby phase 515, 517 to initiate a ping to detect if the power receiver 105 requires a power transfer phase to be initialized.

In some embodiments, the power signal may not be provided continuously but may be provided intermittently. In some embodiments, a discontinuous provision of the power signal is used during the standby phase 515, 517, e.g. by providing a power signal in repeating time intervals. In some embodiments, the standby power signal requirement may indicate a required duty cycle, or equivalently, when the power provision time intervals are constant, the time interval between the time intervals. Such a discontinuous operation may be more practical and easier to implement in some embodiments. It may potentially also result in reduced power consumption.

In a discontinuous standby mode, the power transmitter may provide the power signal in pulses at equidistant time intervals. The power receiver can communicate the required pulse width, duty cycle and/or time between intervals in the standby power signal requirement.

As an example, the Qi standard version 1.0 or version 1.1 may be modified to enable a power receiver to configure the pulse width as well as time interval of such a discontinuous power signal of the power transmitter. The extension can be implemented with a new packet that the power receiver can communicate during the configuration phase. The power transmitter may then apply these values when it enters the standby phase.

The following message may for example be transmitted from the power receiver 105 to the power transmitter 101:

| $b_7$ | $b_6$ | $b_5$ | $b_4$ | $b_3$ | $b_2$ | $b_1$ | $b_0$ |
|---|---|---|---|---|---|---|---|
| $B_0$ | | | Time interval | | | | |
| $B_1$ | | | Pulse width | | | | |

Time Interval: This field contains an unsigned integer value of the time between the start of two succeeding standby power pulses. The least significant bit represents a value of 10 ms. The maximum interval time is approximately 2.5 seconds.

Pulse Width: This field contains an unsigned integer value of the duration of a standby power pulse. The least significant bit represents a value of 2 ms. The maximum pulse duration is approximately 0.5 seconds.

In the previous examples, the power receiver 105 is arranged to extract power from the power signal during the standby phase. However, although this may be advantageous in many embodiments it is not essential in all embodiments. For example, if an intermittent provision of a power signal during the standby phase is used in order to allow the power receiver 105 to indicate that it desires a power transfer using load modulation, the power receiver 105 may not extract any energy from the power signal but merely use it to enable communication. In some embodiments, the power transmitter 101 may provide a signal which is both used for communicating a message by load modulation and for powering.

Thus, in some embodiments, the power receiver 105 may be arranged to communicate messages to the power transmitter 101 during the standby phase 515, 517 by load modulating the power signal. This approach may for example allow the power receiver 105 to transmit a wake-up message to the power transmitter 101. Thus, the power signal may be used by the power receiver 105 to indicate that the standby phase 515, 517 should be terminated and that a power transfer process should be initiated. As the power signal during the standby phase 515, 517 is controlled by the power receiver 105, this allows the power receiver 105 to control the power transmitter 101 to transmit the optimal signal for the specific power receiver 105.

For example, if an intermittent power signal is provided, the power receiver 105 may control the time interval between the intervals in which a power signal is provided, and thus it may control the maximum time between possibilities for transmitting a wake up message by load modulation. For a power receiver 105 that requires a very fast powering up from standby, a power signal is provided with a short time between power signal intervals, whereas for a power receiver 105 that does not require fast powering up from standby, a power signal is provided with a potentially much longer time between power signal intervals. Thus, the operation can be optimized for the individual power receiver 105 and application.

In scenarios where an intermittent signal is used to allow messages from the power receiver 105 to be provided to the power transmitter 101 by load modulation, each of the power-on intervals may be considered to correspond to a ping (similarly to the Qi standard). Thus, the power transmitter 101 may provide a signal which pings the power receiver 105 to see if this wants to exit the standby phase 515, 517. If a wake-up message is received in response to the ping (i.e. the power signal being on in a time interval), the power transmitter 101 may exit the standby phase 515, 517 to initialize a power transfer. The wake-up message may for example be the same message as applied in the conventional ping phase of a Qi system, i.e. the system may follow the protocol and specifications of the ping phase.

Such a wake-up message may specifically be used to indicate that the power receiver 105 wants to initiate a charging operation for an internal energy store. For example, the power receiver 105 may continuously monitor the energy storage level of an internal energy store (e.g. the charge of an internal capacitor or battery). If this level falls below a given threshold, it is desirable to recharge the battery. Therefore, initially when the level is above the threshold, the power receiver 105 responds to the ping provided during the standby phase 515, 517 with a message that indicates that no power transfer is necessary. However, if the level falls below the threshold, it proceeds to respond with a message that indicates that a power transfer is required. In response, the system initiates a direct or indirect transition into the power transfer phase 511, 513. The power receiver 105 then proceeds to charge the energy store using the power from the power signal during the power transfer phase 511, 513. When the charging is complete, the power receiver 105 transmits a message indicating that no further power transfer is required and that the system should enter the standby phase 515, 517.

In such an example, the power transmitter 101 provides a ping to the power receiver 105 which is exploited to recharge the energy storage of the power receiver to above a desired level. The ping interval period can by the power receiver 105 be set sufficiently short to allow the power receiver 105 to wake up the power transmitter 101 before the power storage of the power receiver 105 is drained too much.

More generally, in response to a ping from the power transmitter 101, the power receiver 105 can indicate if it needs power or not. In case it does not need power, it can communicate an end-power packet.

The interval time from the end of one ping to the beginning of the next can be controlled by the power receiver 105. Specifically, the power receiver 105 can transmit a standby power signal requirement indicating the required maximum interval that the power transmitter 101 can apply between two consecutive pings.

As a specific example of a system that has a high degree of compatibility with the Qi system, the power receiver 105 may respond to an initial ping of the ping phase 503, 505 by communication of the necessary packets as required by the Qi v1.0 standard in order to enter the identification and configuration phase 507, 509. In this phase, the power receiver 105 can communicate a configuration packet which includes a standby power signal requirement that indicates whether the power receiver 105 requires a minimum ping interval or not during standby phase.

The power receiver 105 can continue according to the Qi-standard until it desires to end the power transfer. The end-power-packet from the power receiver 105 may then indicate whether the power transmitter 101 should enter a standby phase 515 with some power signal provision, or whether it should enter the selection phase 501 where no power signal is provided.

After entering the standby phase 515, the power transmitter 101 will generate a ping with the required time interval. For each ping, the power receiver 105 can decide whether to respond with a message terminating the power transfer initialization, in which case the power transmitter 101 will remain in the standby phase and it will not proceed to the configuration or power phases. In some embodiments, the message terminating the power transfer initialization may also indicate e.g. a new minimum ping interval time, how the power transmitter shall wake-up from the standby mode, etc.

The power receiver 105 may also decide that a power transfer is required, in which case it responds to the ping, and the power transfer initialization proceeds.

In some embodiments, the power receiver 105 may not extract any power from the ping signal but only use this as a means for load modulation. However, in some embodiments, the ping signal may be sufficiently strong to allow the power receiver 105 to extract power from the signal. In this case, the power receiver 105 may thus not only use the ping signal as a means of communication but also to provide power e.g. to re-charge the energy store. This may in many scenarios provide increased flexibility, e.g. by allowing small power provision to be achieved in the standby phase, together with the option of a very fast, yet passive (load modulation based) initialization of a full power transfer operation.

In another embodiment the power receiver does not provide a wake-up message to the power transmitter at all during the standby phase. Instead it requires the power transmitter to power-up from standby phase within a period of time. After the system enters the standby phase, the power transmitter will power up by entering the (normal) ping phase providing a power signal at the moment or just before the period of standby time exceeds. Thus, the ping phase is executed as part of the standby phase. This allows the power receiver to recharge its energy store using the normal power signal from the power transmitter. When the charge is sufficient, the power receiver may indicate to re-enter the standby phase. In such embodiment, the power transmitter does not have to provide any power signal during the standby phase except for when the ping phase is executed as part of the standby phase. The effective result is equivalent to the situation where the power transmitter provides an intermitting ping signal during the standby phase, especially if the period of standby time equals to the time interval between the intermitting pings.

The approach may for example be implemented by an extension of the Qi standard v1.0 or 1.1 allowing a power receiver to configure the ping time interval of the power transmitter in the standby phase. The extension can be implemented with a new packet that the power receiver communicates during the configuration phase.

An example of a format of such a message is the following:

| | $b_7$ | $b_6$ | $b_5$ | $b_4$ | $b_3$ | $b_2$ | $b_1$ | $b_0$ |
|---|---|---|---|---|---|---|---|---|
| $B_0$ $B_1$ | | | | Ping Interval Time | | | | |

Ping Interval Time—the unsigned integer contained in this field indicates the interval time between the end of the end power packet and the start of a new ping. The value is expressed in seconds. In case the power transmitter removes the power signal by any other means than the end power packet, this field indicates the time between removing the power signal end the start of a new digital ping. The default value is 60 seconds. This value will be used in case the power receiver does not communicate this message to the power transmitter.

It will be appreciated that the system may typically enter the standby phase 515, 517 from the power transfer phase 511, 513. However, in some scenarios, the system may enter the standby phase 515, 517 directly from the configuration phase 507, 509 or the ping phase 503, 505 if the power receiver 105 e.g. generates and transmits a message indicating that it is not necessary to perform a power transfer. For example, if the protocol requires or allows the standby power signal requirement to be communicated as part of a configuration phase message, the power receiver 105 may respond to a ping by initiating a power transfer process via the configuration phase 507, 509. A new standby power signal requirement may be provided during the configuration phase 507, 509 after which the power receiver 105 may send a message indicating that the system should return to the standby phase 515, 517 directly without proceeding to the power transfer phase 511, 513. This may provide an efficient way of reconfiguring operation in the standby phase 515, 517 in many embodiments.

In many embodiments, the system may be arranged to enter the standby phase 515, 517 from the power transfer phase 511, 513. Specifically, the power receiver 105 may transmit an end of power transfer phase message (specifically an end of power message (when it no longer requires the power provision of the power transfer phase 515, 517. In response to receiving such a message, the power transmitter 101 may enter the standby phase 515 and start to provide a power signal as defined by a previously receiver standby power signal requirement (e.g. received as part of the configuration phase 507, 509). In some embodiments, the end of power transfer phase message may indicate whether the system should enter the standby phase 515, 517 or whether it should enter another phase (specifically the selection phase 501 where no power signal is provided).

Specifically, for an enhanced Qi system, the power receiver may terminate the power transfer phase by transmitting an End PowerTransfer Packet with the following format:

| b7 | b6 | b5 | b4 | b3 | b2 | b1 | b0 |
|---|---|---|---|---|---|---|---|
| B0 | End Power Transfer Code | | | | | | |

End Power Transfer Code: This field identifies the reason for the End PowerTransfer request, as listed in Table 0-2 of the Qi Specification version 1.0 and 1.1. The power receiver will typically not transmit End Power Transfer Packets that contain any of the values that Table 0-2 lists as reserved.

However, in the enhanced Qi system, the End Power Transfer Code field has been updated such that it can indicate that the reason for terminating the power transfer phase is that the system should enter the standby phase.

The End PowerTransfer Codes may specifically be:

| Reason | Value |
|---|---|
| Unknown | 0x00 |
| Charge Complete | 0x01 |
| Internal Fault | 0x02 |
| Over Temperature | 0x03 |
| Over Voltage | 0x04 |
| Over Current | 0x05 |
| Battery Failure | 0x06 |
| Reconfigure | 0x07 |
| No Response | 0x08 |
| Standby | 0x09 |
| Reserved | 0x0A . . . 0xFF |

The power receiver may use the codes in the following way
0x00 as specified in Qi version 1.0.
0x01 as specified in Qi version 1.0.
0x02 as specified in Qi version 1.0.
0x03 as specified in Qi version 1.0.
0x04 as specified in Qi version 1.0.
0x05 as specified in Qi version 1.0.
0x06 as specified in Qi version 1.0.
0x07 as specified in Qi version 1.0.
0x08 as specified in Qi version 1.0.
0x09 The Receiver uses this value to indicate that the power transmitter 101 should enter the standby phase.

In some embodiments, the requirement message may be communicated as part of the power transfer phase 511, 513. For example, it may be communicated as part of the end of power transfer phase message.

Indeed, in some embodiments the transmission of the end of power transfer phase message may in itself provide the standby power signal requirement. For example, in some embodiments, the power receiver 105 may at the end of the power transfer phase 511, 513, and in preparation to the standby phase 515, 517, the power receiver 105 may transmit control messages that set the power level of the power signal to a desired level for the power signal during the standby phase 515, 517. Specifically, the power receiver 105 may first switch out the load while remaining in the power transfer phase 511, 513. It may then proceed to transmit a series of power control error messages that result in the power level of the power signal being reduced to a desired level for the standby phase 515, 517. When this level is reached, the power receiver 105 transmits the end of power transfer phase message which results in the power transmitter 101 entering the standby phase 515, 517. The power transmitter 101 then proceeds to maintain the power signal at this value. Thus, the end of power transfer phase message provides an indication that the current power level of the power signal should be maintained in the standby phase 515, 517. The power transmitter 101 then proceeds to maintain this level constant without any power control loop.

In many embodiments, the power receiver 105 may transmit the requirement as part of the configuration phase 507, 509 prior to the power transfer phase 511, 513. The configuration phase 507, 509 may in some embodiments only be performed prior to the power transfer phase 511, 513 for some instances of the power transfer phase being initialized (such as specifically the first time the power receiver 105 proceeds to the power transfer phase 511, 513 from the standby phase or the ping phase).

The requirement message may thus be provided significantly before the standby phase 515, 517 is entered and may be part of the general configuration of the operation of the power transfer system. The requirement may specifically be part of a negotiation subphase of the configuration phase 507, 509.

Providing the requirement message as part of the configuration phase 507, 509 may allow facilitated operation in many embodiments, and may often reduce the modifications required to existing systems and standards to support the introduction of a standby phase as described.

Furthermore, the system may be arranged to configure several other aspects of the operation of the system in connection with the standby phase 515, 517 (typically but not necessarily as part of the configuration phase 507, 509 (and specifically the negotiation subphase).

For example, the power receiver 105 may configure the power transmitter 101 to perform an activity to be performed by the power transmitter when exiting the standby phase 515, 517.

Specifically, if the power transmitter 101 receives an active or passive wake up message, it will exit the standby phase 515, 517.

In many embodiments, the system may exit the standby phase 51, 517 to enter the ping phase 503, 505. The system may then proceed to use the same approach for setting up a power transfer as when the system enters the ping phase 503, 505 from the selection phase 501. Such an approach may allow the same approach to be followed, and may provide improved backwards compatibility, robustness, facilitated implementation and/or reduced complexity.

In other embodiments, the process causing the system to exit the standby phase 515, 517 may correspond to the process performed in the ping phase 503, 505. For example, when pings are used in the standby phase 515, 517, these may correspond to those used in the ping phase 503, 505, and the same protocols etc. may be used. Therefore, there is no need to repeat the process by entering the ping phase 503, 505, and in some embodiments the system therefore enters the configuration phase 507, 509 directly from the standby phase 515, 517.

In some embodiments, the operation may further skip the configuration phase 507, 509. Thus, in some embodiments, the power transmitter 101 and power receiver 105 may directly enter the power transfer phase 511, 513 when exiting the standby phase 515, 517. Such an approach may allow a much faster and more efficient initialization of a power transfer phase 511, 513. This may be particularly suitable for scenarios wherein relatively short but frequent power transfer phase operations are used (e.g. to maintain charge in a capacitor). However, a downside is that the power transfer is not (re)configured for the individual power transfer phase execution. Typically, the power transmitter 101 will proceed to apply the parameters from the termination of the previous power transfer phase 511, 513. As another example, the power transfer phase 511, 513 may be initiated with nominal parameter values.

The different approaches may have different advantages and disadvantages.

In some embodiments, the power receiver 105 may control how the power transmitter 101 should exit the standby phase, and specifically whether the configuration phase should be skipped.

This may specifically be configured during the configuration phase 507, 509. The configuration phase 507, 509 may for example also be used to define whether continuous or discontinuous operation should be used, whether active or passive wake-up messages are used etc.

It will be appreciated that the same message may be used to provide such configuration data and to provide the standby power signal requirement.

Specifically, the power receiver 105 may during the configuration phase communicate configuration information in order to instruct the power transmitter
- at which event the power transmitter 101 has to wake-up, specifically if wake up is provide as an active wake-up signal or as a passive wake up signal;
- whether the power transmitter 101 has to provide a standby power signal during the standby phase 515, and whether this standby power signal has to be continuous or discontinuous;
- and if discontinuous what the timing requirements are (e.g. the maximum interval between pings);
- how the power transmitter has to resume after wake-up, specifically whether to exit the standby phase to directly enter the power transfer phase or whether to enter the configuration phase.

The following describes an exemplary extension of the Qi standard to enable a power receiver to configure the standby mode of a power transmitter. The extension can be implemented by adding six configuration bits to the existing configuration message defined in the Qi specification version 1.0.

|       | $b_7$  | $b_6$  | $b_5$    | $b_4$    | $b_3$ | $b_2$ | $b_1$ | $b_0$ |
|-------|--------|--------|----------|----------|-------|-------|-------|-------|
| $B_0$ | Power Class |    |          | Maximum Power |   |       |       |       |
| $B_1$ |        |        |          | Reserved |       |       |       |       |
| $B_2$ | Prop   |        | Reserved |          |       |       | Count |       |
| $B_3$ | WkUpA  | WkUpB  | Ping     | Stdby    | Cont  | R2PT  |       |       |
| $B_4$ |        |        |          | Reserved |       |       |       |       |

Power Class as specified in Qi version 1.0.

Maximum Power as specified in Qi version 1.0

Prop as specified in Qi version 1.0.

WkUpA if this bit is set to ONE, the power transmitter shall wake-up from standby on an active wake-up signal provided by the power receiver.

WkUpB if this bit is set to ONE, the power transmitter shall wake-up from standby on a passive wake-up signal provided by the power receiver, which could be impedance change/load modulation provided by the power receiver.

Ping If this bit is set to ONE, the power transmitter shall start a new ping within $t_{pinginterval}$ after receiving (the end of) the end-power packet indicating to enter the standby mode, or otherwise after removing the power signal.

Stdby If this bit is set to ONE, the power transmitter provides a standby power signal to the power receiver after receiving an end-power packet indicating to enter the standby mode. If this bit is set to ZERO, the power transmitter does not provide a standby power signal after receiving an end power packet, regardless of the content of this packet.

Cont If this bit is set to ONE, the standby power signal shall be continuous. If this bit is set to ZERO the standby power signal shall be discontinuous.

R2PT If this bit is set to ONE, the power transmitter returns to the power transfer mode after the detection of a wake-up signal from the power receiver. If another event has interrupted the power transmitter before, the power transmitter starts with a ping. The power transmitter has to ensure that the power receiver is still present.

Reserved as specified in Qi version 1.0.

Count as specified in Qi version 1.0.

The previous description has focused on describing the standby phase 515, 517 as a completely separate phase of the selection phase 501 and the ping phase 503, 505. However, it will be appreciated that in some embodiments, the operation in the phases may be very similar and indeed there may be some overlap between the phases, and that the same functionality may be used in more than one of the phases.

For example, the pings provided in the standby phase 515, 517 may correspond directly to the pings provided in the ping phase 503, 505, and indeed the standby phase 515, 517 may in some scenarios be considered to provide a parallel operation as the ping phase 503, 505 but being controlled by the standby power signal requirement from the power receiver 105.

Indeed, in some embodiments where a discontinuous power signal and passive load modulation is used, the standby phase 515, 517 can be implemented by switching the power transmitter 101 between the selection phase 501 and the ping phase 503, 505 in accordance with the standby power signal requirement from the power receiver 105.

Specifically, if the selection phase 501 is implemented as one computational process and the ping phase 503, 505 is implemented as a second computational process, the standby phase 515, 517 may be implemented by the power transmitter 101 executing the first computational process and switching temporarily to the second computational process at intervals given by the timing indication provided by the standby power signal requirement.

Thus, in some embodiments, the standby phase may include sub-phases, such as for example other Qi phases. Specifically, the standby phase may consist or comprise in the selection phase and the ping phase. In such embodiments, the first message from the power receiver 105 may provide a timing indication relating to the transitioning between the selection phase and the ping phase.

For example, the standby phase may consist in the selection phase and the ping phase. The power transmitter 101 may enter the standby phase by first entering the selection phase. It then remains in the selection phase until it transitions to the ping phase (which is also considered part of the standby phase). The timing of this transition may be determined by the first message from the receiver which specifically may indicate a maximum duration for the selection phase before entering the ping phase. In the example, the power signal provided in the standby phase thus corresponds to the power signal when in the ping (sub)phase with no power signal being provided when in the selection (sub) phase. Thus, in the example, the message from the power receiver 105 indicates how the power signal in the standby phase (comprising the selection phase and the ping phase) should be operated by providing timing information for transitions from the selection phase to the ping phase.

In the example, a new message is thus introduced which informs the power transmitter of the maximum allowed interval between ping phases. The power transmitter proceeds to operate in the selection phase but switches to the ping phase as indicated by the message. The power receiver 105 may then initiate an exit from the standby phase by proceeding to the configuration or power transfer phase. Alternatively, the system may remain in the standby phase and may accordingly return to the selection phase. When it has been in this phase for the duration indicated by the message, the power transmitter 101 may again enter the ping phase etc.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

End Power Transfer Code: This field identifies the reason for the End Power Transfer request, as listed in Table 0-2 of the Qi Specification version 1.0 and 1.1. The power receiver will typically not transmit End Power Transfer Packets that contain any of the values that Table 0-2 lists as reserved.

The invention claimed is:

1. A method of operating an inductive power transfer system, the method comprising:
   generating a wireless power signal using a power transmitter when the power transmitter is in a power transfer phase;
   transmitting a first message from a power receiver to the power transmitter during a standby phase, wherein the first message comprises a standby power signal requirement for the power signal;
   receiving the first message at the power transmitter; and providing the power signal to the power receiver in accordance with the standby power signal requirement during the standby phase, wherein the first message indicates a maximum duration of an interval in the standby phase, wherein no power signal is provided by the power transmitter during the interval.

2. The method of claim 1, wherein the standby power signal requirement is indicative of a power requirement of the power signal during the standby phase.

3. The method of claim 2, wherein the standby power signal requirement represents a minimum power for a reduced functionality of the power receiver.

4. The method of claim 3, wherein the reduced functionality of the power receiver comprises functionality for initializing a wake-up process for the power receiver.

5. The method of claim 3, wherein the power requirement indicates a minimum power for maintaining an energy storage requirement for the power receiver during the standby phase.

6. The method of claim 1,
wherein the power transmitter is configured to provide the power signal intermittently during the standby phase,
wherein the standby power signal requirement is indicative of a timing of time intervals in which the power signal is provided.

7. The method of claim 1,
wherein the power receiver transmits a wake-up message to the power transmitter during the standby phase
wherein the power transmitter moves to the power transfer phase in response to receiving the wake-up message.

8. The method of claim 7, wherein the wake-up message is transmitted from the power receiver by load modulation of the power signal during the standby phase.

9. The method of claim 1, wherein the power receiver is configured to transmit the first message during the power transfer phase.

10. The method of claim 1, wherein the power transmitter is configured to enter the standby phase in response to receiving an end of power transfer phase message.

11. The method of claim 1, wherein the power receiver charges an internal energy store from the power signal during the standby phase.

12. The method of claim 1, wherein the power transmitter and the power receiver switch from the standby phase to the power transfer phase without entering a configuration phase.

13. The method of claim 1,
wherein the power receiver is arranged to transmit the first message during a configuration phase,
wherein the configuration phase occurs prior to the power transfer phase.

14. The method of claim 1,
wherein the power receiver is configured to transmit a second message to the power transmitter,
wherein the second message indicates an activity to be performed by the power transmitter in response to receiving a wake-up message.

15. The method of claim 14, wherein the second message indicates a phase the power transmitter should enter after a wake-up from the standby phase.

16. A method of operating a power transmitter of an inductive power transfer system, wherein the power transfer system comprises the power transmitter and a power receiver, wherein the inductive power transfer system supports communication from the power receiver to the power transmitter based on load modulation, the method comprising:

generating a wireless power signal for the power receiver when in a power transfer phase;

receiving a first message during a standby phase, wherein the first message comprises a standby power signal requirement for the power signal; and providing the power signal in accordance with the standby power signal requirement during the standby phase, wherein the first message indicates a maximum duration of an interval in the standby phase, wherein no power signal is provided by the power transmitter during the interval.

17. The method of claim 16, wherein the standby power signal requirement is indicative of a power requirement of the power signal during the standby phase.

18. The method of claim 16, wherein the standby power signal requirement represents a minimum power for a reduced functionality of the power receiver.

19. The method of claim 16,
wherein the power transmitter provides the power signal intermittently during the standby phase,
wherein the standby power signal requirement is indicative of a timing of time intervals in which the power signal is provided.

20. The method of claim 16, wherein the power transmitter transitions to the power transfer phase in response to receiving a wake-up message from the power receiver during the standby phase.

21. A power receiver circuit for an inductive power transfer system, comprising:

a power circuit, wherein the power circuit is arranged to extract power from a wireless power signal when in a power transfer phase;

a transmitter circuit, wherein the transmitter circuit is arranged to transmit a first message to a power transmitter, wherein the first message comprises a standby power signal requirement for the wireless power signal during a standby phase; and a receiver circuit, wherein the receiver circuit is arranged to receive the power signal when in the standby phase, wherein the inductive power transfer system comprises a communication transmitter circuit, wherein the communication transmitter circuit is arranged to generate a wireless power signal when in a power transfer phase, wherein the inductive power transfer system supports communication from the power receiver circuit to the communication transmitter circuit based on a load modulation of the wireless power signal.

22. The power receiver circuit of claim 21, wherein the standby power signal requirement is indicative of a power requirement of the power signal during the standby phase.

23. The power receiver circuit of claim 21, wherein the standby power signal requirement represents a minimum power for a reduced functionality of the power receiver circuit.

24. The power receiver circuit of claim 21,
wherein the power transmitter circuit provides the power signal intermittently during the standby phase,
wherein the standby power signal requirement is indicative of a timing of time intervals,
wherein the power signal is provided during the time intervals.

25. A method of operating a power transmitter of an inductive power transfer system, wherein the power transfer system comprises the power transmitter and a power receiver, wherein the inductive power transfer system supports communication from the power receiver to the power transmitter based on load modulation, the method comprising:

generating a wireless power signal for the power receiver when in a power transfer phase;

receiving a first message comprising a standby power signal requirement for the power signal during a standby phase; and providing the power signal in accordance with the standby power signal requirement during the standby phase, wherein the power receiver charges an internal energy store from the power signal during the standby phase.

\* \* \* \* \*